(12) United States Patent
Carlson

(10) Patent No.: US 11,658,348 B2
(45) Date of Patent: May 23, 2023

(54) BATTERY ELECTROLYTE COMPOSITION

(71) Applicant: Tygrus, LLC, Troy, MI (US)

(72) Inventor: Lawrence Carlson, Troy, MI (US)

(73) Assignee: Tygrus, LLC, Troy, MI (US)

( * ) Notice: Subject to any disclaimer, the term of this patent is extended or adjusted under 35 U.S.C. 154(b) by 735 days.

(21) Appl. No.: 16/552,552

(22) Filed: Aug. 27, 2019

(65) Prior Publication Data

US 2020/0083568 A1    Mar. 12, 2020

Related U.S. Application Data

(60) Provisional application No. 62/728,055, filed on Sep. 6, 2018.

(51) Int. Cl.
*H01M 10/08*     (2006.01)

(52) U.S. Cl.
CPC .... *H01M 10/08* (2013.01); *H01M 2300/0005* (2013.01)

(58) Field of Classification Search
CPC ......... H01M 10/08; H01M 2300/0002; H01M 2300/0005
See application file for complete search history.

(56) References Cited

U.S. PATENT DOCUMENTS

| | | | |
|---|---|---|---|
| 4,902,591 A * | 2/1990 | Clerici | H01M 10/52 429/57 |
| 2010/0239899 A1* | 9/2010 | Brown | H01M 4/22 429/141 |

FOREIGN PATENT DOCUMENTS

| | | |
|---|---|---|
| CN | 108039520 A | 5/2018 |
| KR | 20160126580 A | 11/2016 |
| RU | 2582652 C1 | 4/2016 |

OTHER PUBLICATIONS

International Search Report for PCT/US2019/049867, dated Jan. 16, 2020, 7 pages.
JPS 63187566A (Japan Storage Battery Co Ltd.) excerpt, Written Opinion of the International Searching Authority for PCT/US2019/049867, dated Jan. 16, 2020, 4 pages.
International Preliminary Report on Patentability for PCT/US2019/049867, dated Mar. 18, 2021, 6 pages.

* cited by examiner

*Primary Examiner* — Nathanael T Zemui
(74) *Attorney, Agent, or Firm* — Young Basile Hanlon & MacFarlane, P.C.

(57) ABSTRACT

An electrolyte composition for use in an electrolytic cell and an electrolytic cell that includes the same. The electrolytic cell includes a chemical component having the general formula:

$$[H_xO_{\frac{(x-1)}{2}}]Z_y \qquad \text{I}$$

wherein x is an odd integer $\geq 3$; y is an integer between 1 and 20; and Z is one of a monoatomic ion from Groups 14 through 17 having a charge value between −1 and −3 or a polyatomic ion having a charge between −1 and −3. The electrolytic composition also includes between 1 and 300 ppm ionic salts selected from the group consisting of alkali metals salts and alkali earth metal salts and mixtures thereof; and water. The battery electrolyte composition has a specific gravity between 1.07 and 1.4.

24 Claims, 4 Drawing Sheets

BATTERY ELECTROLYTE COMPOSITION

The present application is a non-provisional application that claims priority to U.S. Provisional Application Ser. No. 62/728,055 filed Sep. 6, 2018, the specification of which is incorporated in its entirety herein.

BACKGROUND

The present invention relates to a novel battery electrolyte composition. More particularly, the present invention pertains to a novel battery electrolyte composition for use in rechargeable batteries such as wet cell batteries including flooded batteries such as lead-acid batteries.

Wet cell batteries such as lead-acid acid batteries provide a cost-effective way to supply various power needs, particularly in situations where high supplies of surge current are required. These features, along with the relative low cost of such batteries, make them attractive for use in motor vehicles to provide the high current required in a variety of automotive applications. Because of their relative inexpensiveness compared to newer technologies, lead-acid batteries find application in storage for back-up power systems and high availability systems such as various stand-alone power systems. Such battery systems include a negative plate (cathode) and a positive plate (anode) and a battery electrolyte solution that facilitates the flow of electrical charge between the cathode and the anode. The electrolyte solution in a typical lead acid automotive battery is typically a sulfuric acid solution that acts as a lead acid accumulator.

Wet cell batteries, particularly employing sulfuric acid as the electrolyte component, have numerous drawbacks and the desire to provide wet cell batteries that provide improvements or increases in one or more characteristic including safety, charge life, charge density, recharge cycle, performance stability, at temperature extremes, plate contamination and degradation and the like.

While the presence of unbalanced charges has been hypothesized, various species of water molecules can exist in transient states. It is believed that stable forms of complex water molecules would have desirable characteristics and properties if these could be identified and produced. Thus, it would be desirable to produce a stable electrolyte material that could be employed independently or used in a solution material.

SUMMARY

Disclosed herein is battery electrolyte composition comprising: between 0.001% by volume and 50% by volume of a compound having the general formula:

$$[H_xO_{\frac{(x-1)}{2}}]Z_y \qquad \text{I}$$

wherein x is an odd integer ≥3;
y is an integer between 1 and 20; and
Z is one of a monoatomic ion from Groups 14 through 17 having a charge value
between −1 and −3 or a polyatomic ion having a charge between −1 and −3;
between 1 and 300 ppm ion salts selected from the group consisting of alkali metal salts and alkali earth metal salts and mixtures thereof; and
water, wherein the battery electrolyte composition has a specific gravity between 1.07 and 1.4.

Also disclosed is battery electrolyte composition comprising:
an effective amount of a compound having the following general formula:

$$[H_xO_{\frac{(x-1)}{2}} + (H_2O)_y]Z \qquad \text{II}$$

wherein x is an odd integer ≥3;
y is an integer between 1 and 20; and
Z is a monoatomic ion from Group 14 through 17 having a charge values between −1 and −3 or a polyatomic ion having a charge between −1 and −3;
between 1 and 300 ppm ionic salts selected from the group consisting of alkali metal salts and alkali earth metal salts and mixtures thereof; and
water, wherein the electrolyte composition has a specific gravity between 1.07 and 1.4.

Also disclosed is a battery electrolyte composition comprising:
an effective amount of chemical compound having the formula:

$$[H_xO_{\frac{(x-1)}{2}} + (H_2O)_y]Z \qquad \text{III}$$

wherein x is an odd integer ≥3;
y is an integer between 1 and 20; and
Z is a polyatomic ion;
between 1 and 300 ppm ionic salts selected from the group consisting of alkali metal salts and alkali earth metal salts and mixtures thereof; and
a polar solvent, wherein at least a portion of the chemical composition is present as $H_9O_4+$ in coordinated combination with $H_9O_4+:SO_4H$ and working bridging ligands containing stable hydronium ($H_3O+$) clusters and wherein the battery electrolyte composition has a specific gravity between 1.07 and 1.4.

Also disclosed is a battery that includes at least one cathode, at least one anode and an aqueous solution, the aqueous solution comprising:
between 0.001% by volume and 50% by volume of a compound having the general formula:

$$[H_xO_{\frac{(x-1)}{2}}]Z_y \qquad \text{I}$$

wherein x is an odd integer ≥3;
y is an integer between 1 and 20; and
Z is one of a monoatomic ion from Groups 14 through 17 having a charge value between −1 and −3 or a polyatomic ion having a charge between −1 and −3;
between 1 and 300 ppm ionic salts selected from the group consisting of alkali metal salts and alkali earth metal salts and mixtures thereof; and
water, wherein the battery electrolyte composition has a specific gravity between 1.07 and 1.4.

Also disclosed herein is an electrochemical cell, the electrochemical cell having at least one anode, at least one cathode and a electrochemical electrolyte, the electrochemical electrolyte comprising:
between 0.001% by volume and 50% by volume of a compound having the general formula:

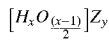

wherein x is an odd integer ≥3;
y is an integer between 1 and 20; and
Z is one of a monoatomic ion from Groups 14 through 17 having a charge value between −1 and −3 or a polyatomic ion having a charge between −1 and −3;
between 1 and 300 ppm ion salts selected from the group consisting of alkali metal salts and alkali earth metal salts and mixtures thereof; and
water, wherein the battery electrolyte composition has a specific gravity between 1.07 and 1.4.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

It has been discovered, quite unexpectedly, that certain stable forms of complex water molecules have characteristics and properties that, when employed in electrolytic cells such as those found in secondary batteries can provide an associated secondary battery or electrolytic cell that is environmentally friendly and/or has enhanced safety characteristics. In certain embodiments it is believed that the use of such electrolytes and provide a secondary battery with one or more enhanced performance characteristics. Non-limiting examples of such performance characteristics include capacity, cold cranking capacity, C-rates, load, shelf life and the like. Where desired or required, the secondary battery can be configured as a wet-cell battery such as a lead acid storage battery.

Disclosed herein is a novel battery electrolyte composition that can be employed in wet cell batteries. Also disclosed herein is a wet cell battery that comprises at least one anode, at least one cathode and the novel battery electrolyte composition disclosed herein. Also disclosed is a system comprising at least one controller, at least one inverter coupled to the controller and at least one wet cell battery the wet cell battery comprising at least one anode, at least one cathode and an electrolyte solution that includes the novel battery electrolyte composition disclosed herein.

Figure 1:
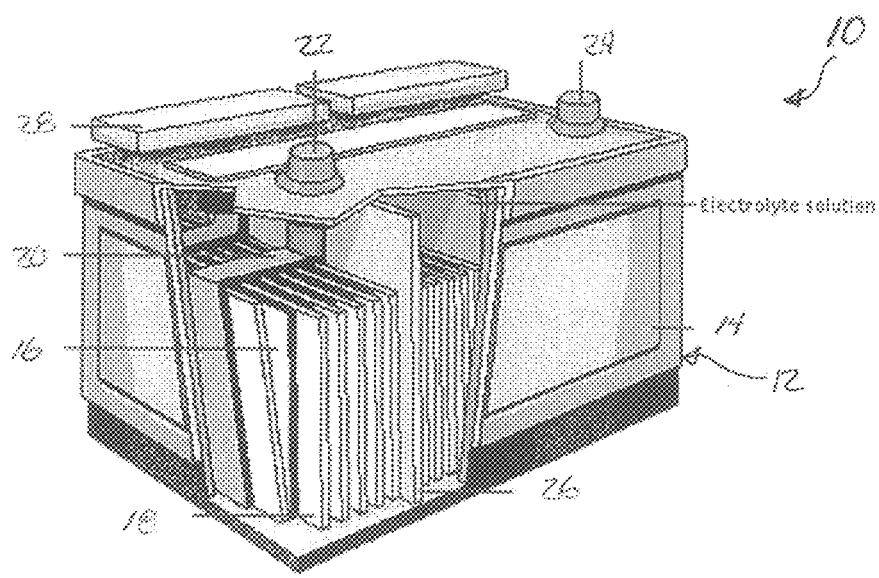
FIG. 1 is a diagram of a representative battery as disclosed herein.

A configuration of a representative secondary battery 10 is presented for representative purposes in FIG. 1. The representative secondary battery 10 depicted is a lead acid storage battery 12, sometomes referred to as a flooded battery. The representative lead acid storage battery 12 includes a suitable protective casing or housing 14 that defines at least one interior chamber. The secondary battery 10 as depicted includes at least one positive electrode 16 and at least one negative electrode 18. In the secondary battery 10 depicted in FIG. 1, a plurality of positive electrodes 16 and negative electrodes 18 are located in alternating relationship to form a plurality of electrolytic cells. In suitable lead acid storage batteries, the positive electrode(s) 16 may be composed, in whole or in part, of a suitable lead dioxide material or suitable equivalent; while the negative electrode (s) 18 can be composed, in whole or in part, of lead or a suitable equivalent. The positive electrode(s) that compose the various electrolytic cells tin the system can be electrically connected to one another by at least one cell connector 20 to a positive terminal 22. Negative electrode(s) 18 can be connected to a suitable negative terminal 24 by a suitable cell connector (not shown). The representative secondary battery can include cell divider(s) 26 at spaced intervals in the interior chamber as desired or required. Where desired or required, the representative secondary battery 10 can also include vent caps 28 or the like.

In certain applications, the representative secondary battery can be sealed or unsealed. It is also contemplated that the representative secondary battery can be filled or unfilled with the novel battery electrolyte composition as disclosed herein. Thus, the present disclosure contemplates that secondary batteries can be full or partially filled with the novel battery electrolyte as disclosed herein. In certain embodiments, it is also considered to be within the purview of this disclosure that the secondary battery 10 can be one in which the battery electrolyte composition as disclosed herein can be employed as the forming solution and drained or can be one that is employed as the use solution during battery operations.

Also disclosed is an electrolytic cell that comprises at least one anode, at least one cathode and the novel battery electrolyte composition disclosed herein. In certain configurations it is contemplated that the electrolytic cell as disclosed herein can be configured as depicted in FIGS. 2 and 3 that provide a graphic depiction of a representative electrolytic cell 50 in respective charging (FIG. 2) or discharging (FIG. 3) states.

Figure 2:
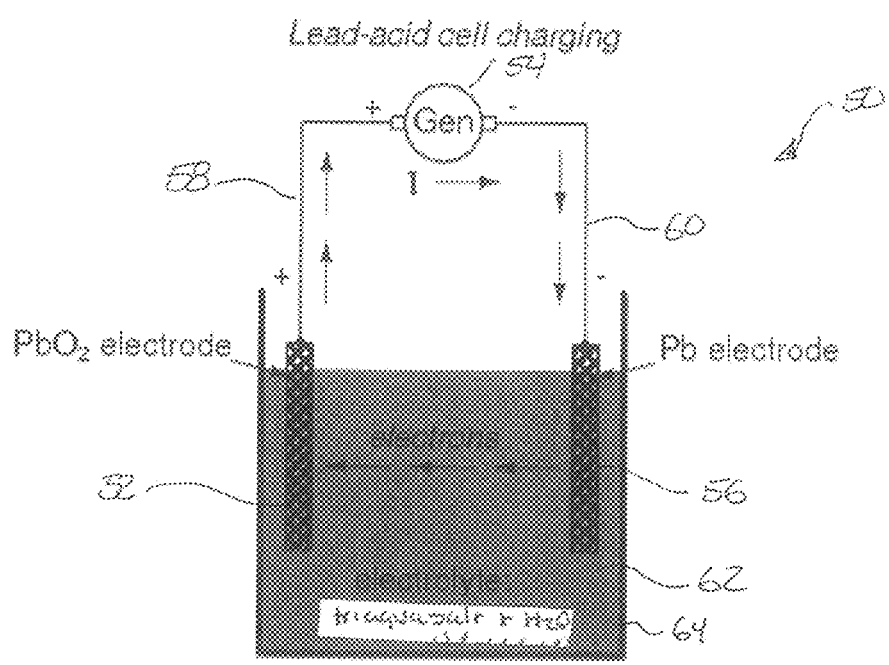
FIG. 2 is a schematic diagram of a simplified cell of a representative battery as disclosed herein in the charging state.
Figure 3:
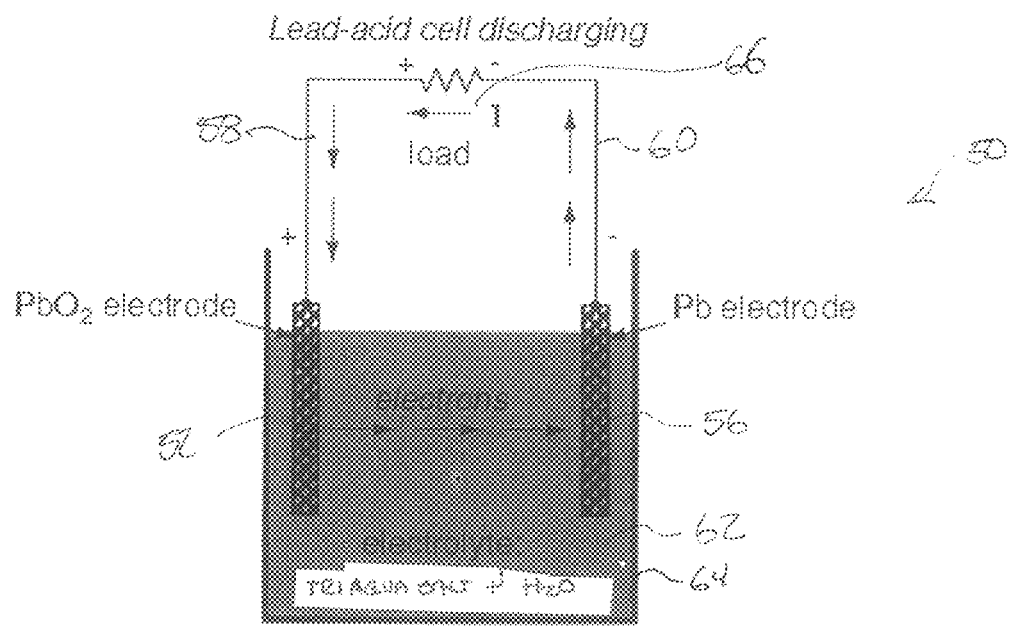
FIG. 3 is a schematic diagram of a simplified cell of a representative battery as disclosed herein in discharging state.
Figure 4:
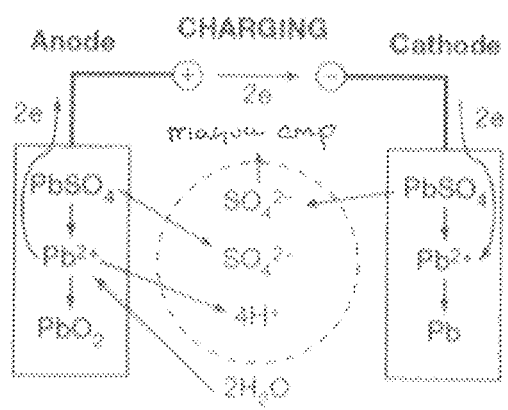
FIG. 4 is a diagram of the representative reactions occurring in the battery of FIG. 1 during charging.

As depicted in FIG. 2, the electrolytic cell 50 includes at least one positive electrode 52 that is in electrical communication with a suitable generator 54 through leads such as leads 58 and at least one negative electrode 56 that communicates with generator 54 through leads such as leads 60. The positive electrode(s) 52 and negative electrode(s) 56 are in contact with the novel battery electrolyte composition 62 that is contained in a suitable container 64. The novel battery electrolyte composition 62 is designated by the legend "triaqua salt+water" present as a triaqua sulphate compound and will be discussed in greater detail subsequently. The positive electrode 52 and negative electrode 56 can be partially or fully submerged in the battery electrolyte composition 62 in the use condition. It is contemplated that the positive electrode 52 can be composed of a suitable material such as lead oxide ($PbO_2$) and the negative electrode 56 can be composed of a suitable material such as lead (Pb). In the charging state, the electron flow through the battery electrolyte composition is from the negative electrode 56 to the positive electrode 52.

In the charging state, the battery electrolyte as disclosed herein facilitates ion and electron flow with electrons flowing in the direction of the positive electrode 52. Where the positive electrode is $PbO_2$, the reaction occurring at the positive electrode is believed to be:

$$Pb(II)SO_4 + 2H_2O \rightarrow Pb(IV)O_2 + 3H^+ + \text{triaqua salt}^+ 2e^-.$$

Where the negative electrode is lead, the reaction at the negative electrode is believed to be:

$$Pb(II)SO_4 + H^+ + 2e^- \rightarrow Pb + \text{triaqua salt}^-$$

The overall cell reaction is believed to be:

$$2PbSO_4 + 2H_2O \rightarrow PbO_2 + Pb + 2(\text{triaqua})$$

As depicted in FIG. 3, the electrolytic cell 50 includes at least one positive electrode 52 that is in electrical communication with a suitable load 64 through leads such as leads 58 and at least one negative electrode 56 that communicates with generator 54 through leads such as leads 60. The positive electrode(s) 52 and negative electrode(s) 56 are in contact with the novel battery electrolyte composition 62 that is contained in a suitable container 64. The novel battery electrolyte composition 62 is designated by the legend "triaqua salt+water" present as a triaqua sulphate compound and will be discussed in greater detail subsequently. The positive electrode 52 and negative electrode 56 can be partially or fully submerged in the battery electrolyte composition 62 in the use condition. The positive electrode 52 can be composed of a suitable material such as lead oxide ($PbO_2$) and the negative electrode 56 can be composed of a suitable material such as lead (Pb). In the discharge state, the electron flow through the battery electrolyte composition is from the positive electrode 52 to the negative electrode 56.

In the discharging state the battery electrolyte as disclosed herein facilitates ion and electron flow with electrons flowing in the direction of the negative electrode 56. Where the positive electrode is $PbO_2$, the reaction occurring at the positive electrode is believed to be $$Pb(IV)O_2 + 3H^+ + \text{triaqua salt}^- + 2e^- \rightarrow Pb(II)SO_4 + 2H_2O$$

Where the negative electrode is lead, the reaction at the negative electrode is believed to be:

$$Pb + \text{triaqua salt}^+ \rightarrow Pb(II)SO_4 + H^+ + 2e^-$$

The overall cell reaction is believed to be:

$$PbO_2 + Pb + 2\text{triaqua} \rightarrow 2PbSO_4 + 2H_2O$$

The novel battery electrolyte composition disclosed herein comprises between 0% and 99% sulfuric acid, a stable oxonium ion derived complex present in an amount between 0.01% by volume and 50% by volume, between 1 and 500 ppm ionic salts selected from the group consisting of alkali metals salts and alkali earth metal salts and mixtures thereof and a polar solvent. In certain embodiments, battery electrolyte composition will have a specific gravity between 1.05 and 1.8, with specific gravities between 1.07 and 1.4, between 1.2 and 1.4, between 1.25 and 1.3 being employed in certain embodiments. In certain embodiments the sulfuric acid component will be between 0 and 10% by volume, with the sulfuric acid component being 0% in certain embodiments.

In certain embodiments, it is contemplated that the stable oxonium ion complex will be present in an amount between 20 and 40% by volume. In certain embodiments, the stable oxonium complex will be present in the stable battery electrolyte composition an amount between 30 and 36% by volume.

In certain embodiments, it is contemplated that the ionic salt component is selected from the group consisting of alkali metal salts, alkali earth metal salts and mixtures thereof. In certain embodiments, the ionic slat component can include one or more of the following: calcium salts, sodium salts, magnesium salts and potassium salts. In certain specific embodiments, the ionic salt is a calcium salt that is present alone or in combination with one or more of the aforementioned salts. The ionic salt component can be present in a concentration between 1 ppm and 300 ppm of the stable battery electrolyte as disclosed herein. In certain embodiments, the ionic salt component is present in a concentration between 1 and 100 ppm.

In certain embodiments, the ionic salt component includes calcium ions in combination with one or more of the other aforementioned ionic salts, i.e. alkali metal salts, alkali earth metal salts and mixtures thereof. When the ionic salt component includes calcium ions in combination with one or more of the aforementioned ionic salts, it is contemplated that the calcium ion concentration will constitute at least 20% of the ionic salt component. In certain embodiments, it is contemplated that the ion concentration in the novel battery electrolyte can contain between 1 and 100 ppm calcium ions; between 0 and 20 ppm sodium ions; between 0 and 20 ppm magnesium ions; and between 0 and 20 ppm potassium ions.

Heretofore, it was believed that the presence of calcium ions in the battery electrolyte was deleterious to battery function and performance, at least in part due to the increase in internal resistance due to the elevated calcium ion concentration. The present disclosure is predicated, at least in part, on the unexpected discovery that the presence of calcium ions in the battery electrolyte composition as disclosed herein functions as a stabilizer. Without being bound to any theory, it is believed that the presence of calcium ions in the composition as disclosed herein interact with the oxonium ion complex in a manner that regulates protons and proton transit in the electrolyte composition and controls hydrogen dissociation in the electrolyte composition.

As defined herein "oxonium ion complexes" are generally defined as positive oxygen cations having at least one trivalent oxygen bond. In certain embodiments, the oxygen cation will exist in aqueous solution as a population predominantly composed of one, two and three trivalently bonded oxygen cations present as a mixture of the aforesaid cations or as material having only one, two or three trivalently bonded oxygen cations. Non-limiting examples of oxonium ions having trivalent oxygen cations can include at least one of hydronium ions.

It is contemplated that the in certain embodiments the oxygen cation will exist in aqueous solution as a population predominantly composed of one, two and three trivalently bonded oxygen anions present as a mixture of the aforesaid anions or as material having only one, two or three trivalently bonded oxygen anions. The oxonium ion complex can exist as a stable composition of matter and can be admixed with a suitable solvent.

When the composition of matter as disclosed herein is admixed with a solvent such as an aqueous or organic solvent, the resulting composition is a solution that can be composed of hydronium ions, hydronium ion complexes and mixtures of the same. Suitable materials can also be referred to as hydroxonium ion complexes. The novel electrolyte composition of as disclosed herein exhibits a low pH and exists as a population that may include stable hydronium compounds Heretofore it has been theorized that extreme trace amounts of cationic hydronium may spontaneously form in water from water molecules in the presence of hydrogen ions. Without being bound to any theory, it is believed that naturally occurring hydronium ions are extremely rare. The concentration of naturally occurring hydronium ions in water is estimated to be no more than 1 in 480,000,000. If they occur at all, hydronium ion compounds are extremely unstable. It is also theorized that naturally occurring hydronium ions are unstable transient species with lifespans typically in the range of nanoseconds. Naturally occurring hydronium ion species are reactive and are readily solvated by water and as such these hydronium ions (hydrons) do not exist in a free state.

When introduced into pure water, the stable hydronium material disclosed herein is one that will remain identifiable. It is believed that the stable hydronium material disclosed herein can complex with water molecules to form hydration cages of various geometries, non-limiting examples of which will be described in greater detail subsequently. The stable electrolyte material as disclosed herein, when introduced into a polar solvent such as an aqueous solution is stable and can be isolated from the associated solvent as desired or required.

Conventional strong organic and inorganic acids such as those having a $pK_a \geq 1.74$, for example sulfuric acid, when added to water, will ionize completely in the aqueous solution. The ions so generated will protonate existing water molecules to form $H_3O+$ and associate stable clusters. Weaker acids, such as those having a $pK_a < 1.74$, when added to water, will achieve less than complete ionization in aqueous solution but can have utility in certain applications. Thus, it is contemplated that the acid material employed to produce the stable electrolyte material can be a combination of one or more acids. In certain embodiments, the acid material will include at least one acid having a $pK_a$ greater than or equal to 1.74 in combination with weaker acids(s).

In the present disclosure, it has been found quite unexpectedly that a stable hydronium material can be synthesized which can be added to an aqueous solution, will produce a polar solvent and provide an effective $pK_a$ which is dependent on the amount of stable hydronium electrolyte material added to the corresponding solution independent of the hydrogen ion concentration originally present in that solution. The resulting solution can function as a polar solvent and can have an effective $pK_a$ between 0 and 5 in certain applications when the initial solution pH prior to addition of the stable hydronium material is between 6 and 8 and can be employed to produce the novel battery electrolyte composition as disclosed herein.

It is also contemplated that the stable material synthesized in the manner as disclosed herein to produce a stable oxonium complex can be added to solutions having an initial pH in the alkaline range, for example between 8 and 12 to effectively adjust the pH of the resulting solvent and/or the effective or actual $pK_a$ of the resulting solution. Addition of the stable electrolyte material as disclosed herein can be added to an alkaline solution without perceivable reactive properties including, but not limited to, exothermicity, oxidation or the like.

The acidity of theoretical hydronium ions existing in water as a result of aqueous auto-dissociation is the implicit standard used to judge the strength of an acid in water. Strong acids are considered better proton donors than the theoretical hydronium ion material, otherwise a significant portion of acid would exist in a non-ionized state. As indicated previously, theoretical hydronium ions derived from aqueous auto-dissociation are unstable as a species, random in occurrence and believed to exist, if at all, in extreme low concentration in the associated aqueous solution. Generally, hydronium ions in aqueous solution are present in concentrations between less than 1 in 480,000,000 and can be isolated, if at all, from native aqueous solution via solid or liquid phase organosynthesis as monomers attached to a superacid solution in structures such as $HF-SbF_5SO_2$. Such materials can be isolated only in extremely low concentration and decompose readily upon isolation.

In contrast, the stable hydronium material as disclosed herein, provides a source of concentrated hydronium ions that are long lasting and can be subsequently isolated from solution if desired or required.

In certain embodiments, the oxonium ion complex can have the following chemical structure:

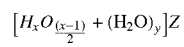

$$[H_xO_{\frac{(x-1)}{2}} + (H_2O)_y]Z$$

wherein x is an odd integer between 3 and 11;
y is an integer between 1 and 10; and
Z is a polyatomic or monoatomic ion.

The polyatomic ion Z can be an ion that is derived from an acid having the ability to donate one or more protons. The associated acid can be one that would have a $pK_a$ values $\geq 1.7$ at 23° C. The polyatomic ion Z employed can be one having a charge of +2 or greater. Non-limiting examples of such polyatomic ions include sulfate ions, carbonate ions, phosphate ions, oxalate ions, chromate ions, dichromate ions, pyrophosphate ions and mixtures thereof. In certain embodiments, it is contemplated that the polyatomic ion can be derived from mixtures that include polyatomic ions that include ions derived from acids having $pK_a$ values $\leq 1.7$.

The stable composition of matter as disclosed herein is stable at standard temperature and pressure and can exist as an oily liquid. The composition of matter as disclosed herein can be added to water or other polar solvents to produce a polar liquid that contains an effective concentration of stable hydronium ion that is greater than 1 part per million. In certain embodiments, the stable electrolyte composition material as disclosed herein can provide an effective concentration of stable hydronium ion material that is greater than between 10 and 100 parts per million when admixed with a suitable aqueous or organic solvent.

It has been found, quite unexpectedly, that the stable oxonium ion complex such as the hydroniun ion complexes present in the solution or solvent material as a result of the addition of the stable electrolyte material disclosed herein alter the acid functionality of the resulting solution or solvent material without a concomitant change in the free acid to total acid ratio. The alteration in acid functionality can include characteristics such as change in measured pH, changes in free-to-total acid ratio, changes in specific gravity and rheology. Changes in spectral output and chromatography output are also noted as compared to the incumbent acid materials used in production of the stable electrolyte material containing the initial hydronium ion complex. Addition of the stable electrolyte material as disclosed herein results in changes in $pK_a$ which do not correlate to the changes observed in free-to-total acid ratio.

Thus, the addition of the stable hydronium electrolyte material as disclosed herein to an aqueous solution having an initial pH between 6 and 8 results in a solution having an effective $pK_a$ between 0 to 5. It is also to be understood that $pK_a$ of the resulting solution can exhibit a value less than zero as when measured by a calomel electrode, specific ion ORP probe. As used herein the term "effective $pK_a$" is a measure of the total available hydronium ion concentration present in the resulting solvent. Thus, it is possible that pH and/or associated $pK_a$ of a material when measured may have a numeric value represented between −3 and 7.

Typically, the pH of a solution is a measure of its proton concentration or as the inverse proportion of the —OH moiety. It is believed that the stable electrolyte material as disclosed herein, when introduced into a polar solution, facilitates at least partial coordination of hydrogen protons with the hydronium ion electrolyte material and/or its associated lattice or cage. As such, the introduced stable hydronium ion electrolyte material exists in a state that permits selective functionality of the introduced hydrogen associated with the hydrogen ion.

Thus, the battery electrolyte composition can comprise: between 0.001% by volume and 50% by volume of an oxonium compound having the general formula:

$$\left[ H_x O_{\frac{(x-1)}{2}} + (H_2O)_y \right] Z$$

wherein x is an odd integer between 3 and 11;
y is an integer between 1 and 10; and
Z is a polyatomic or a combination of polyatomic ion and monoatomic ion, wherein at least a portion of Z is a polyatomic sulfur-containing ion;
between 1 and 500 ppm ionic salts selected from the group consisting of alkali metals salts and alkali earth metal salts and mixtures thereof; and
a polar solvent, wherein the battery electrolyte composition has a specific gravity between 1.05 and 1.8.

In certain embodiments, the polar solvent employed in the battery electrolyte composition as outlined can be an aqueous material such as water. Where desired or required, the battery electrolyte composition can have specific gravity between 1.07 and 1.4. In certain embodiments, the specific gravity ca be between 1.2 and 1.4, while in other embodiments, the specific gravity can be between 1.25 and 1.3.

Where desired or required, the battery electrolyte composition can include an ionic salt concentration between 1 and 300 ppm in certain embodiments. In certain embodiments, the ionic slat concentration can be between 1 and 100 ppm. The ionic salt can be one that is selected from the group consisting of calcium salts, sodium salts, magnesium salts, potassium salts and mixtures thereof.

More specifically, it is contemplated that the oxonium compound employed in the battery electrolyte composition as disclosed herein can have the general formula in certain embodiments:

$$\left[ H_x O_{\frac{(x-1)}{2}} \right] Z_y$$

x is an odd integer ≥3;
y is an integer between 1 and 20; and
Z is one of a monoatomic ion from Groups 14 through 17 having a
charge between −1 and −3 or a poly atomic ion having a charge between −1 and −3.

In the composition of matter as disclosed herein, monatomic constituents that can be employed as Z include Group 17 halides such as fluoride, chloride, iodide and bromide; Group 15 materials such as nitrides and phosphides and Group 16 materials such as oxides and sulfides. Polyatomic constituents include carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite. It is contemplated that the composition of matter can be composed of a single one to the materials listed above or can be a combination of one or more of the compounds listed.

It is also contemplated that, in certain embodiments, x is an integer between 3 and 9, with x being an integer between 3 and 6 in some embodiments.

In certain embodiments, y is an integer between 1 and 10; while in other embodiments y is an integer between 1 and 5.

Where desired or required it is contemplated that the oxonium compound can be present in the battery electrolyte composition can be present in an amount between 20 and 40% by volume. In certain embodiments the oxonium compound can be present in an amount between 30 and 36% by volume.

Where desired or required, x can be an integer between 3 and 11 and y is an integer between 1 and 10. Z is a polyatomic ion having a charge of −2 or greater such as a sulfate, sulfite, hydrogen sulfate, hydrogen sulfite. Such polyatomic ions can be employed individually or in a any suitable combination with one another.

Where desired or required, the oxonium compound that is employed in the battery composition as disclosed herein can include an oxonium compound selected from the group consisting of a stoichiometrically balanced chemical composition of at least one of the following: hydrogen (1+), triaqua-µ3-oxotri sulfate (1:1); hydrogen (1+), triaqua-µ3-oxotri carbonate (1:1), hydrogen (1+), triaqua-µ3-oxotri phosphate, (1:1); hydrogen (1+), triaqua-µ3-oxotri oxalate (1:1); hydrogen (1+), triaqua-µ3-oxotri chromate (1:1) hydrogen (1+), triaqua-µ3-oxotri dichromate (1:1), hydrogen (1+), triaqua-µ3-oxotri pyrophosphate (1:1), and mixtures thereof. In certain embodiments, it is contemplated that the oxonium compound can be hydrogen (1+), triaqua-µ3-oxotri sulfate (1:1) employed either alone or in effective combination with one or more of the other aforementioned compounds.

Where desired or required, the oxonium compound employed in the battery electrolyte composition can have the following formula, in certain embodiments:

$$\left[ H_x O_{\frac{(x-1)}{2}} \right] Z_y$$

x is an odd integer between 3 and 12;
y is an integer between 1 and 20; and
Z is one of a group 14 through 17 monoatomic ion having a charge between −1 and −3 or a poly atomic ion having a charge between −1 and −3 as outlined above; some embodiments having x between 3 and 9 and y being an integer between 1 and 5.

It is contemplated that the composition of matter exists as an isomeric distribution in which the value x is an average distribution of integers greater than 3 favoring integers between 3 and 10.

The oxonium material can be formed by the addition of a suitable inorganic hydroxide to a suitable inorganic acid. The inorganic acid may have a density between 22° and 70° baume; with specific gravities between about 1.18 and 1.93. In certain embodiments, it is contemplated that the inorganic acid will have a density between 50° and 67° baume; with specific gravities between 1.53 and 1.85. The inorganic acid can be either a monoatomic acid or a polyatomic acid.

The inorganic acid employed can be homogenous or can be a mixture of various acid compounds that fall within the defined parameters. It is also contemplated that the acid may be a mixture that includes one or more acid compounds that fall outside the contemplated parameters but in combination with other materials will provide an average acid composition value in the range specified. The inorganic acid or acids employed can be of any suitable grade or purity. In certain instances, tech grade and/or food grade material can be employed successfully in various applications.

In preparing the stable electrolyte material as disclosed herein, the inorganic acid can be contained in any suitable reaction vessel in liquid form at any suitable volume. In various embodiments, it is contemplated that the reaction vessel can be non-reactive beaker of suitable volume. The volume of acid employed can be as small as 50 ml. Larger volumes up to and including 5000 gallons or greater are also considered to be within the purview of this disclosure.

The inorganic acid can be maintained in the reaction vessel at a suitable temperature such as a temperature at or around ambient. It is within the purview of this disclosure to maintain the initial inorganic acid in a range between approximately 23° and about 70° C. However lower temperatures in the range of 15° and about 40° C. can also be employed.

The inorganic acid is agitated by suitable means to impart mechanical energy in a range between approximately 0.5 HP and 3 HP with agitation levels imparting mechanical energy between 1 and 2.5 HP being employed in certain applications of the process. Agitation can be imparted by a variety of suitable mechanical means including, but not limited to, DC servodrive, electric impeller, magnetic stirrer, chemical inductor and the like.

Agitation can commence at an interval immediately prior to hydroxide addition and can continue for an interval during at least a portion of the hydroxide introduction step.

In the process as disclosed herein, the acid material of choice may be a concentrated acid with an average molarity (M) of at least 7 or above. In certain procedures, the average molarity will be at least 10 or above; with an average molarity between 7 and 10 being useful in certain applications. The acid material of choice employed may exist as a pure liquid, a liquid slurry or as an aqueous solution of the dissolved acid in essentially concentrated form.

Suitable acid materials can be either aqueous or non-aqueous materials. Non-limiting examples of suitable acid materials can include one or more of the following: hydrochloric acid, nitric acid, phosphoric acid, chloric acid, perchloric acid, chromic acid, sulfuric acid, permanganoic acid, prussic acid, bromic acid, hydrobromic acid, hydrofluoric acid, iodic acid, fluoboric acid, fluosilicic acid, fluotitanic acid.

In certain embodiments, the defined volume of a liquid concentrated strong acid employed can be sulfuric acid having a specific gravity between 55° and 67° baume. This material can be placed in the reaction vessel and mechanically agitated at a temperature between 16° and 70° C.

In certain specific applications of the method disclosed, a measured, defined quantity of suitable hydroxide material can be added to an agitating acid, such as concentrated sulfuric acid, that is present in the non-reactive vessel in a measured, defined amount. The amount of hydroxide that is added will be that sufficient to produce a solid material that is present in the composition as a precipitate and/or a suspended solids or colloidal suspension. The hydroxide material employed can be a water-soluble or partially water-soluble inorganic hydroxide. Partially water-soluble hydroxides employed in the process as disclosed herein will generally be those which exhibit miscibility with the acid material to which they are added. Non-limiting examples of suitable partially water-soluble inorganic hydroxides will be those that exhibit at least 50% miscibility in the associated acid. The inorganic hydroxide can be either anhydrous or hydrated.

Non-limiting examples of water-soluble inorganic hydroxides include water soluble alkali metal hydroxides, alkaline earth metal hydroxides and rare earth hydroxides; either alone or in combination with one another. Other hydroxides are also considered to be within the purview of this disclosure. "Water-solubility" as the term is defined in conjunction with the hydroxide material that will be employed is defined a material exhibiting dissolution characteristics of 75% or greater in water at standard temperature and pressure. The hydroxide that is utilized typically is a liquid material that can be introduced into the acid material. The hydroxide can be introduced as a true solution, a suspension or a super-saturated slurry. It certain embodiments, it is contemplated that the concentration of the inorganic hydroxide in aqueous solution can be dependent on the concentration of the associated acid to which it is introduced. Non-limiting examples of suitable concentrations for the hydroxide material are hydroxide concentrations greater than 5 to 50% of a 5-mole material.

Suitable hydroxide materials include, but are not limited to, lithium hydroxide, sodium hydroxide, potassium hydroxide, ammonium hydroxide, calcium hydroxide, strontium hydroxide, barium hydroxide, magnesium hydroxide, and/or silver hydroxide. Inorganic hydroxide solutions when employed may have concentration of inorganic hydroxide between 5 and 50% of a 5-mole material, with concentration between 5 and 20% being employed in certain applications. The inorganic hydroxide material, in certain processes, can be calcium hydroxide in a suitable aqueous solution such as is present as slaked lime.

In the process as disclosed, the inorganic hydroxide in liquid or fluid form is introduced into the agitating acid material in one or more metered volumes over a defined interval to provide a defined resonance time. The resonance time in the process as outlined is considered to be the time interval necessary to promote and provide the environment in which the hydronium ion material as disclosed herein develops. The resonance time interval as employed in the process as disclosed herein is typically between 12 and 120 hours with resonance time intervals between 24 and 72 hours and increments therein being utilized in certain applications.

In various applications of the process, the inorganic hydroxide is introduced into the acid at the upper surface of the agitating volume in a plurality of metered volumes. Typically, the total amount of inorganic hydroxide material will be introduced as a plurality of measured portions over the resonance time interval. Front-loaded metered addition being employed in many instances. Front-loaded metered addition", as the term is used herein, is taken to mean addition of the total hydroxide volume with a greater portion being added during the initial portion of the resonance time. An initial percentage of the desired resonance time-considered to be between the first 25% and 50% of the total resonance time.

It is to be understood that the proportion of each metered volume that is added can be equal or can vary based on such non-limiting factors as external process conditions, in situ process conditions, specific material characteristics, and the like. It is contemplated that the number of metered volumes can be between 3 and 12. The interval between additions of each metered volume can be between 5 and 60 minutes in certain applications of the process as disclosed. The actual addition interval can be between 60 minutes to five hours in certain applications.

In certain applications of the process, a 100 ml volume of 5% weight per volume of calcium hydroxide material is added to 50 ml of 66° baume concentrated sulfuric acid in 5 metered increments of 2 ml per minute, with or without admixture. Addition of the hydroxide material to the sulfuric acid produces a material having increasing liquid turbidity. Increasing liquid turbidity is indicative of calcium sulfate solids forming as precipitate. The produced calcium sulfate can be removed in a fashion that is coordinated with continued hydroxide addition in order to provide a coordinated concentration of suspended and dissolved solids.

Without being bound to any theory, it is believed that the addition of calcium hydroxide to sulfuric acid in the manner defined herein results in the consumption of the initial hydrogen proton or protons associated with the sulfuric acid resulting in hydrogen proton oxygenation such that the proton in question is not off-gassed as would be generally expected upon hydroxide addition. Instead, the proton or protons are recombined with ionic water molecule components present in the liquid material.

After the suitable resonance time as defined has passed, the resulting material is subjected to a non-bi-polar magnetic field at a value greater than 2000 gauss; with magnetic fields great than 2 million gausses being employed in certain applications. It is contemplated that a magnetic field between 10,000 and 2 million gausses can be employed in certain situations. The magnetic field can be produced by various suitable means. One non-limiting example of a suitable magnetic field generator is found in U.S. Pat. No. 7,122,269 to Wurzburger, the specification of which is incorporated by reference herein.

Solid material generated during the process and present as precipitate or suspended solids can be removed by any suitable means. Such removal means include, but need not be limited to, the following: gravimetric, forced filtration, centrifuge, reverse osmosis and the like.

The stable electrolyte composition of matter as disclosed herein is a shelf-stable viscous liquid that is believed to be stable for at least one year when stored at ambient temperature and between 50 to 75% relative humidity. The stable electrolyte composition of matter can be use neat in various end use applications. The stable electrolyte composition of matter can have a 1.87 to 1.78 molar material that contains 8 to 9% of the total moles of acid protons that are not charged balanced.

The stable electrolyte composition of matter which results from the process as disclosed herein has molarity of 200 to 150 M strength, and 187 to 178 M strength in certain instances, when measured titrametrically though hydrogen coulometry and via FFTIR spectral analysis. The material has a gravimetric range greater than 1.15; with ranges greater than 1.9 in in certain instances. The material, when analyzed, is shown to yield up to 1300 volumetric times of orthohydrogen per cubic ml versus hydrogen contained in a mole of water.

It is also contemplated that the composition of matter as disclosed can be introduced into a suitable polar solvent and will result in a solution having concentration of hydronium ions greater than 15% by volume. In some applications, the concentration of hydronium ions can be greater than 25% and it is contemplated that the concentration of hydronium ions can be between 15 and 50% by volume.

The suitable polar solvent can be either aqueous, organic or a mixture of aqueous and organic materials. In situations where the polar solvent includes organic components, it is contemplated that the organic component can include at least one of the following: saturated and/or unsaturated short chain alcohols having less than 5 carbon atoms, and/or saturated and unsaturated short chain carboxylic acids having less than 5 carbon atoms. Where the solvent comprises water and organic solvents, it is contemplated that the water to solvent ratio will be between 1:1 and 400:1, water to solvent, respectively. Non-limiting examples of suitable solvents include various materials classified as polar protic solvents such as water, acetic acid, methanol, ethanol, n-propanol, isopropanol, n-butanol, formic acid and the like.

The ion complex that is present in the solvent material resulting from the addition of the composition of matter as defined therein is generally stable and capable of functioning as an oxygen donor in the presence of the environment created to generate the same. The material may have any suitable structure and solvation that is generally stable and capable of functioning as an oxygen donor. Particular embodiments of the resulting solution will include a concentration of the ion as depicted by the following formula:

$$\left[H_xO_{\frac{(x-1)}{2}}\right]^+$$

wherein x is an odd integer ≥3.

It is contemplated that ionic version of the compound as disclosed herein exists in unique ion complexes that have greater than seven hydrogen atoms in each individual ion complex which are referred to in this disclosure as hydronium ion complexes. As used herein, the term "hydronium ion complex" can be broadly defined as the cluster of molecules that surround the cation $H_xO_{x-1}+$ where x is an integer greater than or equal to 3. The hydronium ion complex may include at least four additional hydrogen molecules and a stoichiometric proportion of oxygen molecules complexed thereto as water molecules. Thus, the formulaic representation of non-limiting examples of the hydronium ion complexes that can be employed in the process herein can be depicted by the formula:

$$\left[H_xO_{\frac{(x-1)}{2}} + (H_2O)_y\right]$$

where x is an odd integer of 3 or greater; and
y is an integer from 1 to 20, with y being an integer between 3 and 9 in certain embodiments.

In various embodiments disclosed herein, it is contemplated that at least a portion of the hydronium ion complexes will exist as solvated structures of hydronium ions having the formula:

$$H_{5+x}O_{2y}+$$

wherein x is an integer between 1 and 4; and
y is an integer between 0 and 2.
In such structures, an $$\left[H_xO_{\frac{(x-1)}{2}}\right]^+$$

core is protonated by multiple $H_2O$ molecules. It is contemplated that the hydronium complexes present in the composition of matter as disclosed herein can exist as Eigen complex cations, Zundel complex cations or mixtures of the two. The Eigen solvation structure can have the hydronium ion at the center of an $H_9O_4+$ structure with the hydronium complex being strongly bonded to three neighboring water molecules. The Zundel solvation complex can be an $H_5O_2+$ complex in which the proton is shared equally by two water molecules. The solvation complexes typically exist in equilibrium between Eigen solvation structure and Zundel solvation structure. Heretofore, therespective solvation structure complexes generally existed in an equilibrium state that favors the Zundel solvation structure.

The present disclosure is based, at least in part, on the unexpected discovery that stable materials can be produced in which hydronium ion exists in an equilibrium state that favors the Eigen complex. The present disclosure is also predicated on the unexpected discovery that increases in the concentration of the Eigen complex in a process stream can provide a class of novel enhanced oxygen-donor oxonium materials.

The process stream as disclosed herein can have an Eigen solvation state to Zundel solvation state ratio between 1.2 to 1 and 15 to 1 in certain embodiments; with ratios between 1.2 to 1 and 5 to 1 in other embodiments.

The novel enhanced oxygen-donor oxonium material as disclosed herein can be generally described as a thermodynamically stable aqueous acid solution that is buffered with an excess of proton ions. In certain embodiments, the excess of protons ions can be in an amount between 10% and 50% excess hydrogen ions as measured by free hydrogen content.

It is contemplated that oxonium complexes employed in the process discussed herein can include other materials employed by various processes. Non-limiting examples of general processes to produce hydrated hydronium ions are discussed in U.S. Pat. No. 5,830,838, the specification of which is incorporated by reference herein.

The composition disclosed herein has the following chemical structure:

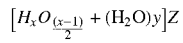

wherein x is an odd integer ≥3;
y is an integer between 1 and 20; and
Z is a polyatomic or monatomic ion.

The polyatomic ion employed can be an ion derived from an acid having the ability to donate one or more protons. The associated acid can be one that would have a pKa values ≥1.7 at 23° C. The ion employed can be one having a charge of +2 or greater. Non-limiting examples of such ions include sulfate, carbonate, phosphate, chromate, dichromate, pyrophosphate and mixtures thereof. In certain embodiments, it is contemplated that the polyatomic ion can be derived from mixtures that include polyatomic ion mixtures that include ions derived from acids having pKa values ≤1.7.

In certain embodiments, the composition of matter can have the following chemical structure:

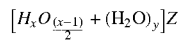

wherein x is an odd integer between 3-11;
y is an integer between 1 and 10; and
Z is a polyatomic ion or monoatomic ion.

The polyatomic ion can be derived from an ion derived from an acid having the ability to donate on or more protons. The associated acid can be one that would have a $pK_a$ values ≥1.7 at 23° C. The ion employed can be one having a charge of +2 or greater. Non-limiting examples of such ions include sulfate, carbonate, phosphate, oxalate, chromate, dichromate, pyrophosphate and mixtures thereof. In certain embodiments, it is contemplated that the polyatomic ion can be derived from mixtures that include polyatomic ion mixtures that include ions derived from acids having $pK_a$ values ≤1.7.

In certain embodiments, the composition of matter is composed of a stoichiometrically balanced chemical composition of at least one of the following: hydrogen (1+), triaqua-µ3-oxotri sulfate (1:1); hydrogen (1+), triaqua-µ3-oxotri carbonate (1:1), hydrogen (1+), triaqua-µ3-oxotri phosphate, (1:1); hydrogen (1+), triaqua-µ3-oxotri oxalate (1:1); hydrogen (1+), triaqua-µ3-oxotri chromate (1:1) hydrogen (1+), triaqua-µ3-oxotri dichromate (1:1), hydrogen (1+), triaqua-µ3-oxotri pyrophosphate (1:1), and mixtures thereof in admixture with a polar solvent selected from the group consisting of.

It has been found unexpectedly that that 12-volt batteries flooded and enhanced flooded batteries such as that depicted in FIG. 1 when employing the battery electrolyte composition as disclosed herein can exhibit one of more of lower chare resistance, higher charge acceptance, improved round trip efficiency. It is believed that stop/start and micro-hybrid vehicles will demand additional functional requirements on lead batteries, which automotive OEMs and their suppliers are seeking to address. One of the salient characteristics is increased dynamic charge acceptance. Of sulfuric acid based lead batteries.

As noted at the 2018 European Lead Battery Conference, "Dynamic Charge Acceptance (DCA) of lead-acid batteries can be improved by the use of additives in the negative electrode and other features. This allows 12 V micro-hybrid batteries to be an essential component n vehicle systems to reduce $CO_2$ emissions and fuel consumption. They are also more robust when operated in a partial state-of-charge and in moderate climates but most high DCA additives lead to reduced high temperature durability as measured by standard tests. In addition, the automotive industry needs longer battery lifetimes in hot climates.

Flooded and enhanced flooded batteries (EFB) have been the standard for automotive SLI applications for decades but are currently unable to meet the DCA and high temperature operating life demands of stop/start and micro-hybrid vehicles. Carbon additives significantly improve DCA, but at the cost of higher water loss impacting high temperature operating life. AGM (Absorbent Glass Mat) lead batteries dramatically reduce water loss and with carbon can also support high DCA, but may cost 50%-100% more than EFB versions.

The automotive industry is working closely with the lead battery industry to find more cost-effective solutions that combine better performance and longer operating life. The battery electrolyte as disclosed herein provides a novel material that can be employed instead of or in suitable combination with sulfuric acid and offers many potential benefits for several different lead battery applications with automotive stop/start systems and micro-hybrid being but two non-limiting examples of applications over and above traditional battery applications.

In start/stop applications, a battery may need to start the car engine more than one hundred times more often during its lifetime than a traditional battery. It is also required to support new loads such as an electrical AC compressor to ensure the AC is not disabled when the engine is shut down. Therefore, a stop/start battery must be charged more aggressively than a traditional automotive battery, and this requires the battery to accept much higher levels of charging without overheating and with higher efficiency.

Lead batteries are very effective at discharging high amounts of power, but traditionally they can only be charged slowly. The lead battery industry is seeking new materials that will improve the ability to more rapidly charge batteries under partial State of Charge (pSOC) conditions. Without being bound to any theory, is believed that to 12-volt battery equipped with the battery electrolyte composition as disclosed herein can exhibit a DC charge resistance that, is lower than analogous sulfuric acid 12-volt battery. It is believed that in certain embodiments, the reduction in DC charge resistance can be between 5 and 25% lower over particular State of Charge ranges (pSOC). Non-limiting examples of target state of charge ranges in certain embodiments can be 10-20% State of Discharge/90-80% State of Charge.

One issue presenting with run-in of 12-volt flooded batteries employing sulfuric acid is the degradation in DC charge resistance/DCA from a new battery during the initial run-in period. It has been found unexpectedly that the battery electrolyte composition exhibits reduced charge resistance/DCA degradation even after a few weeks of accelerated testing.

Lead batteries lose energy primarily in charging as compared to discharging, and a lower DC charging resistance should also indicate that the battery is charging with higher efficiency, and higher overall round-trip efficiency.

Without being bound to any theory, it is believed that batter configurations using the battery electrolyte as disclosed herein can exhibit one or more characteristics such as reduced hold current, reduced water loss, reduced positive plate corrosion. Batteries are electrochemical systems that self-degrade over time. Standby battery applications such as automotive SLI (Starter, Lighting, Ignition), telecom and UPS applications constantly charge the battery to ensure that full power is available when needed. In automotive SLI applications the alternator constantly charges 12V batteries to 14.4V.

The hold charging energy provided to a fully charged battery can slowly destroy the battery. The hold charging energy (hold current battery voltage) electrolyzes water to create oxygen and hydrogen gasses some of which escape the battery causing water loss. Some of this hold charging energy also drives positive plate corrosion. The hold current and water loss effects are directly correlated and negatively impact the battery's life expectancy. The correlation between hold current and water loss/corrosion is so strong that manufacturers sometimes measure water loss as integrated hold current (Amp*hours). These negative effects all significantly increase at higher temperatures, which can reach 60° C. or more under the hood.

Sulfuric acid is a highly toxic and corrosive material, requiring special shipping, handling and remediation requirements. Manufacturers have special reporting requirements under U.S. EPA regulations and there are considerations to further restrict the use of sulfuric acid under European REACH regulations. There are also additional liability insurance expenses incurred by manufacturers to handle this material.

There is growing societal interest in reducing or eliminating toxic chemicals in our environment and that the battery electrolyte composition as disclosed herein can be employed to replace millions of gallons of highly toxic sulfuric acid with a safe, non-toxic alternative. There is interest by lead battery manufacturers and the entire industry to position itself as environmentally friendly.

In order to better understand the invention disclosed herein, the following examples are presented. The examples are to be considered illustrative and are not to be viewed as limiting the scope of the present disclosure or claimed subject matter.

Example I

A novel oxonium composition that can be employed in the novel battery electrolyte composition as disclosed herein is prepared by placing 50 ml of concentrated liquid sulfuric acid having a mass fraction $H_2SO_4$ of 98%, an average molarity(M) above 7 and a specific gravity of 66° baume in a non-reactive vessel and maintained at 25° C. with agitation by a magnetic stirrer to impart mechanical energy of 1 HP to the liquid.

Once agitation has commenced, a measured quantity of calcium hydroxide is added to the upper surface of the agitating acid material. The calcium hydroxide material employed is a 20% aqueous solution of 5M calcium hydroxide and is introduced in five metered volumes introduced at a rate of 2 ml per minute over an interval of five hours with to provide a resonance time of 24 hours. The introduction interval for each metered volume is 30 minutes.

Turbidity is produced with addition of calcium hydroxide to the sulfuric acid indicating formation of calcium sulfate solids. The solids are permitted to precipitate periodically during the process and the precipitate removed from contact with the reacting solution.

Upon completion of the 24-hour resonance time, the resulting material is exposed to a non-bi-polar magnetic field of 2400 gauss resulting in the production of observable precipitate and suspended solids for an interval of 2 hours. The resulting material is centrifuged and force filtered to isolate the precipitate and suspended solids.

Example II

The material produced in Example I is separated into individual samples. Some are stored in closed containers at standard temperature and 50% relative humidity to determine shelf-stability. Other samples are subjected to analytical procedures to determine composition. The test samples are subjected to FFTIR spectra analysis and titrated with hydrogen coulometry. The sample material has a molarity ranging from 187 to 178 M strength. The material has a gravimetric range greater than 1.15; with ranges greater than 1.9 in in certain instances. The composition is stable and has a 1.87 to 1.78 molar material that contains 8 to 9% of the total moles of acid protons that are not charged balanced. FFTIR analysis indicates that the material has the formula hydrogen (1+), triaqua-μ3-oxotri sulfate (1:1).

Example III

A 5 ml portion of the material produced according to the method outlined in Example I is admixed in a 5 ml portion of deionized and distilled water at standard temperature and pressure. The excess hydrogen ion concentration is measured as greater than 15% by volume and the pH of the material is determined to be 1.

Example IV

The material produced in Example I can be employed in producing the novel battery electrolyte compositions as disclosed herein. Material produced according to the process outlined in Example I is admixed with deionized water and sufficient ionic salt to provide a composition concentration of 100 ppm. The ionic salt is a mixture of calcium chloride, sodium chloride, magnesium chloride and potassium chloride. In various proportions as listed in Table I The proportion of the material of Example I and deionized water is tailored to provide a composition specific gravities of 1.07, 1.25 1.3 and 1.4.

TABLE I

| Electrolyte Composition | Specific gravity | Ionic concentration ppm | Ionic concentration components ppm | | | |
|---|---|---|---|---|---|---|
| | | | Ca+ | Na+ | Mg+ | K+ |
| I | 1.25 | 100 | 100 | 0 | 0 | 0 |
| II | 1.25 | 100 | 80 | 20 | 0 | 0 |
| III | 1.25 | 100 | 80 | 10 | 10 | 0 |
| IV | 1.25 | 100 | 80 | 0 | 10 | 10 |
| V | 1.25 | 100 | 70 | 10 | 10 | 10 |
| VI | 1.25 | 70 | 70 | 0 | 0 | 0 |
| VII | 1.25 | 50 | 50 | 0 | 0 | 0 |
| VII | 1.25 | 20 | 20 | 0 | 0 | 0 |
| IX | 1.4 | 100 | 100 | 0 | 0 | 0 |
| X | 1.3 | 100 | 100 | 0 | 0 | 0 |
| X | 1.07 | 100 | 100 | 0 | 0 | 0 |

The materials are introduced into lead acid storage batteries and tested for operations 1a performance. The 12-volt flooded lead acid batteries held charge and provide discharge within normal operating parameters.

Example V

Battery Electrolyte Composition I is tested in a 12-volt flooded lead acid storage battery to determine dynamic charge acceptance (DCA) as it correlates with DC charge resistance and provides a straightforward method of an analysis. Analysis of DC charge resistance between Battery Electrolyte Composition I and sulfuric acid indicates that the DC charge resistance is 12-19% lower for Battery electrolyte Composition I over the critical partial State of Charge (pSOC) range of 0.0-20% State of Discharge/90-80% State of Charge needed for stop/start and micro-hybrid vehicles.

Figure 5:
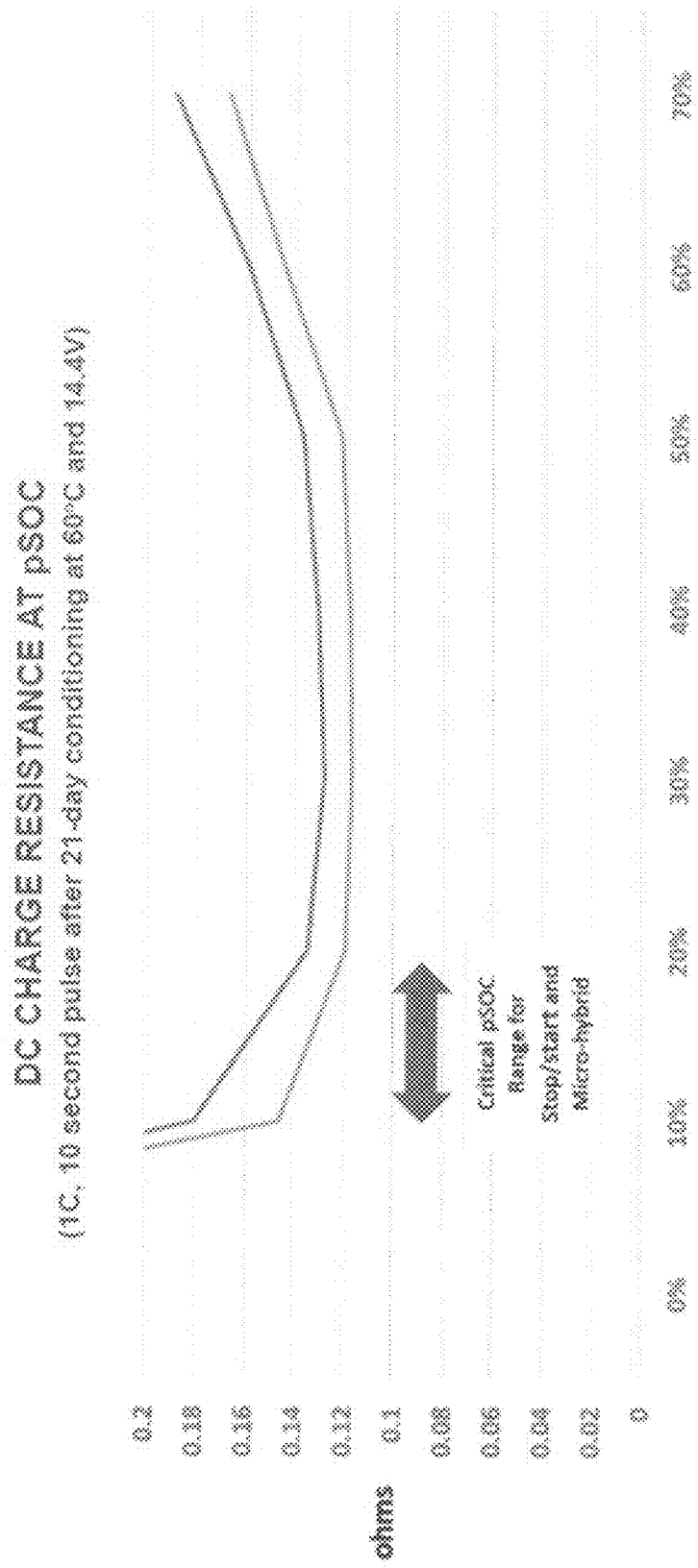
FIG. 5 is a graphic depiction of DC Charge Resistance at pSOC comparing sulfuric acid and the battery electrolyte as disclosed herein.

In testing the 1C 10 second pulse charge represents a typical regenerative braking charge event. The test the is performed after a 21-day where the respective batteries are charged at 60° C. and 14.4V. The same measurements are performed prior the high temperature conditioning and the initial DC charge resistance are nearly identical. Representative results are graphically depicted in FIG. 5.

Lead batteries lose energy primarily in charging as compared to discharging, and a lower DC charging resistance should also indicate that the battery is charging with higher efficiency, and higher overall round-trip efficiency. The preliminary results preliminary results indicate improved round-trip efficiency.

Example VI

The characteristics of reduced hold current, water loss and positive plate corrosion are evaluated for the battery configurations discussed in Example V. The battery configurations of Example IV are tested according to the automotive life procedures outlined in EN50342-1. EN50342-1 is an industry standard test for automotive accelerated life testing by using high temperature 60° C. and continuous charging at 14.4V. Since the battery is fully charged the hold current energy (hold current Amps*14.4V) delivers destructive energy for positive plate corrosion, water loss and heat dissipation.

Figure 6:
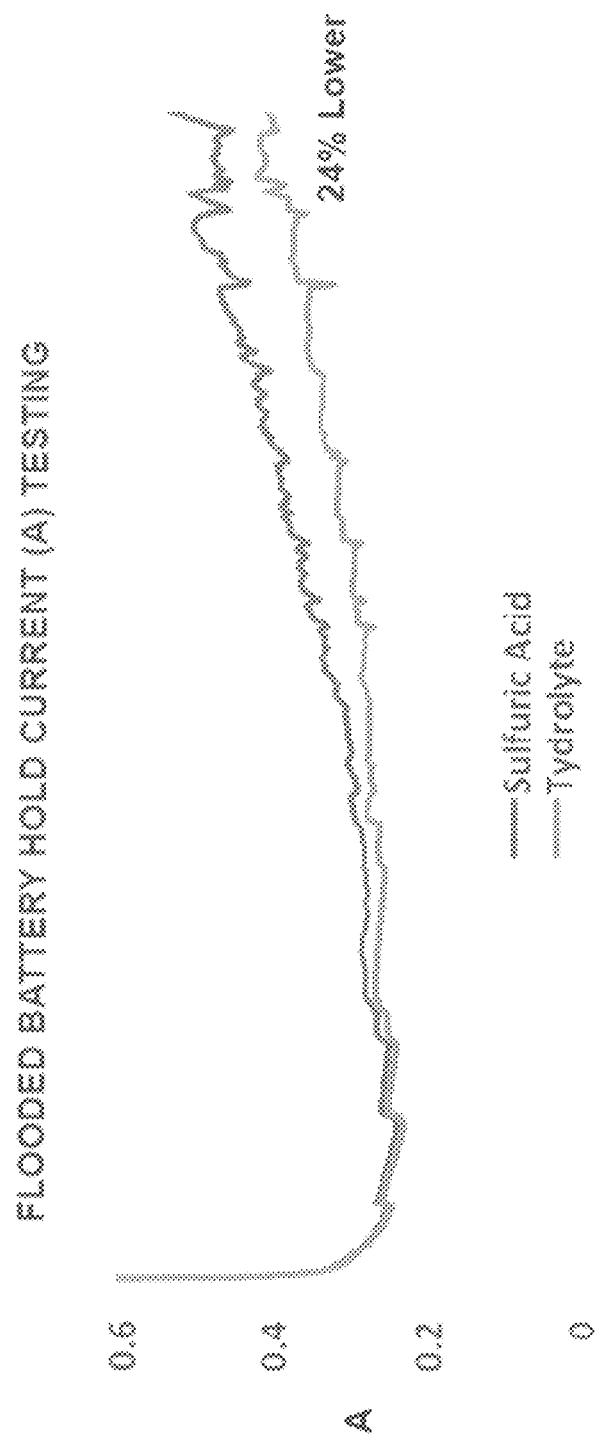
FIG. 6 is a graphic depiction of predicted Flooded Battery Hold Current Testing comparing sulfuric acid and the battery electrolyte as disclosed herein.

After only a few weeks the results show that Battery Electrolyte Composition I significantly reduces hold current by amounts greater than 10 and, in some cases 20% and that this improvement continues to increase as the battery ages. Representative results are depicted in FIG. 6.

The testing results demonstrate than battery electrolyte composition as disclosed herein reduces hold current, water loss and likely positive electrode corrosion. These are critical failure modes for automotive and other lead battery applications. As a result, the lower hold current may indicate that the operational life of the battery can be increased.

In industry standard tests, the battery electrolyte composition as disclosed herein provides a unique and potentially valuable solution to the emerging 1 needs in the areas such as the market for automotive lead acid batteries. The battery electrolyte and disclosed herein possesses the ability to lower water loss and improve battery life at high under-hood operating temperatures, while simultaneously improving pulse charge acceptance and charging efficiency while also replacing sulfuric acid, with a less corrosive and less toxic alternative.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A battery electrolyte composition comprising:
a chemical component having the general formula:

$$[H_xO_{\frac{(x-1)}{2}}]Z_y \qquad \text{I}$$

wherein x is an odd integer between 3 and 11;
y is an integer between 1 and 10; and
Z is one of a monoatomic ion from Groups 14 through 17 having a charge value between −1 and −3 or a polyatomic ion having a charge between −1 and −3;
between 1 and 300 ppm ionic salts selected from the group consisting of alkali metals salts and alkali earth metal salts and mixtures thereof; and
water, wherein the battery electrolyte composition has a specific gravity between 1.07 and 1.4, wherein the chemical component of Formula I is present in an amount between 20 and 40% by volume.

2. The battery electrolyte composition of claim 1 wherein the battery electrolyte composition has a specific gravity between 1.2 and 1.4.

3. The battery electrolyte composition of claim 1 wherein the battery electrolyte composition has a specific gravity between 1.25 and 1.3.

4. The battery electrolyte composition of claim 2 wherein the ionic salt component is present in an amount between 1 and 100 ppm.

5. The battery electrolyte composition of claim 4 wherein the ionic salt is selected from the group consisting of calcium salts, sodium salts, magnesium salts, potassium salts and mixtures thereof.

6. A battery electrolyte composition comprising:
a chemical component having the general formula:

$$\left[ H_xO \frac{(x-1)}{2} \right] Z_y \qquad \text{I}$$

wherein x is an odd integer between 3 and 11;
y is an integer between 1 and 10; and
Z is one of a monoatomic ion from Groups 14 through 17 having a charge value between −1 and −3 or a polyatomic ion having a charge between −1 and −3;
between 1 and 300 ppm ionic salts selected from the group consisting of alkali metals salts and alkali earth metal salts and mixtures thereof; and
water, wherein the battery electrolyte composition has a specific gravity between 1.07 and 1.4 wherein in the compound of Formula I is present in an amount between 30 and 36% by volume and Z is a polyatomic ion having a charge of −2 or greater.

7. The battery electrolyte composition of claim 6 wherein in the compound of Formula I, Z is selected from the group consisting of sulfite, sulfate, carbonate, phosphate, oxalate, chromate, dichromate, pyrophosphate and mixtures thereof.

8. The battery electrolyte composition of claim 1 composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1), and mixtures thereof.

9. A battery electrolyte composition comprising:
a compound having the following general formula:

$$\left[ H_xO_{\frac{(x-1)}{2}} + (H_2O)_y \right] Z \qquad \text{II}$$

wherein x is an odd integer ≥3;
y is an integer between 1 and 20; and
Z is one of a monoatomic ion from Groups 14 through 17 having a charge value between −1 and −3 or a polyatomic ion having a charge between −1 and −3;
between 1 and 300 ppm ions selected from the group consisting of alkali metals and alkali earth metals and mixtures thereof; and
water, wherein the battery electrolyte composition has a specific gravity between 1.07 and 1.4;
wherein in the compound of Formula II is present in an amount between 0.001% and 50% by volume and x is an integer between 3 and 11 and y is an integer between 1 and 10.

10. The battery electrolyte composition of claim 9 wherein the battery electrolyte composition has a specific gravity between 1.2 and 1.4.

11. The battery electrolyte composition of claim 10 wherein the battery electrolyte composition has a specific gravity between 1.25 and 1.3.

12. The battery electrolyte composition of claim 9 wherein the ions selected from the group consisting of alkali metals and alkali earth metal and mixtures thereof are present at a concentration between 1 and 100 ppm, the ion concentration comprising;
between 1 and 100 ppm calcium ions;
between 0 and 20 ppm sodium ions;
between 0 and 20 ppm magnesium ions; and
between 0 and 20 ppm potassium ions.

13. The battery electrolyte composition of claim 9 wherein x is an integer between 3 and 11 and y is an integer between 1 and 10.

14. The battery electrolyte composition of claim 13 wherein in the chemical compound of Formula II is present in an amount between 30 and 36% by volume and the polyatomic ion has a charge of −2 or greater.

15. The battery electrolyte composition of claim 14 wherein in the compound of Formula II, Z is selected from the group consisting of sulfate, carbonate, phosphate, oxalate, chromate, dichromate, pyrophosphate and mixtures thereof.

16. The battery electrolyte composition of claim 13 wherein the compound of Formula II is composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1), and mixtures thereof.

17. A battery electrolyte composition comprising:
a chemical compound having the following formula:

$$\left[ H_xO_{\frac{(x-1)}{2}} + (H_2O)_y \right] Z \qquad \text{III}$$

wherein x is an odd integer ≥3;
y is an integer between 1 and 20; and
Z is a polyatomic ion;
between 1 and 300 ppm ions selected from the group consisting of alkali metals and alkali earth metals and mixtures thereof; and
a polar solvent, wherein at least a portion of the chemical composition is present as $H_9O_4+$ in coordinated combination with $H_9O_4+:SO_4H$ and working bridging ligands containing stable hydronium ($H_3O+$) clusters and wherein the battery electrolyte composition has a specific gravity between 1.07 and 1.4;
wherein the compound of Formula III is present in an amount between 30 and 36% by volume.

18. The battery electrolyte composition of claim 17 wherein the chemical compound of Formula III is present in an amount between 10% and 50% by volume and x is an integer between 3 and 11 and y is an integer between 1 and 10.

19. The battery electrolyte composition of claim 18 wherein Z is a polyatomic ion selected having a charge of −2 or greater.

20. The battery electrolyte composition of claim 18 wherein the polar solvents selected from the group consisting of water, short chain alcohols having between one and 4 carbon atoms and mixtures thereof.

21. The battery electrolyte composition of claim 20 wherein the polar solvent contains between 20% and 100% by volume water.

22. The battery electrolyte composition of claim 21 composed of a stoichiometrically balanced chemical composition of at least one of the following: hydrogen (1+), triaqua-µ3-oxotri sulfate (1:1); hydrogen (1+), triaqua-µ3-oxotri carbonate (1:1), hydrogen (1+), triaqua-µ3-oxotri phosphate, (1:1); hydrogen (1+), triaqua-µ3-oxotri oxalate (1:1); hydrogen (1+), triaqua-µ3-oxotri chromate (1:1) hydrogen (+), triaqua-µ3-oxotri dichromate (1:1), hydrogen (1+), triaqua-µ3-oxotri pyrophosphate (1:1); and mixtures thereof.

23. The battery electrolyte composition of claim 17 wherein the chemical compound of Formula III is present in an amount sufficient to provide an effective pKa of between 0 and 5.

24. The battery electrolyte composition of claim 17 wherein the chemical composition of Formula III is present in an amount sufficient to provide an effective hydronium ion concentration between about 1 ppm and 25% by volume.

* * * * *